Jan. 31, 1967 R. TORRESEN ET AL Re. 26,154

PIN DETECTING AND INDICATING APPARATUS

Original Filed Aug. 23, 1961 5 Sheets-Sheet 1

Inventors.
Robert Torresen.
Anthony J. Gretzky.

By. Hofgren, Brady, Wegner, Allen & Stellman

Attorneys.

PIN DETECTING AND INDICATING APPARATUS
Original Filed Aug. 23, 1961 5 Sheets-Sheet 2
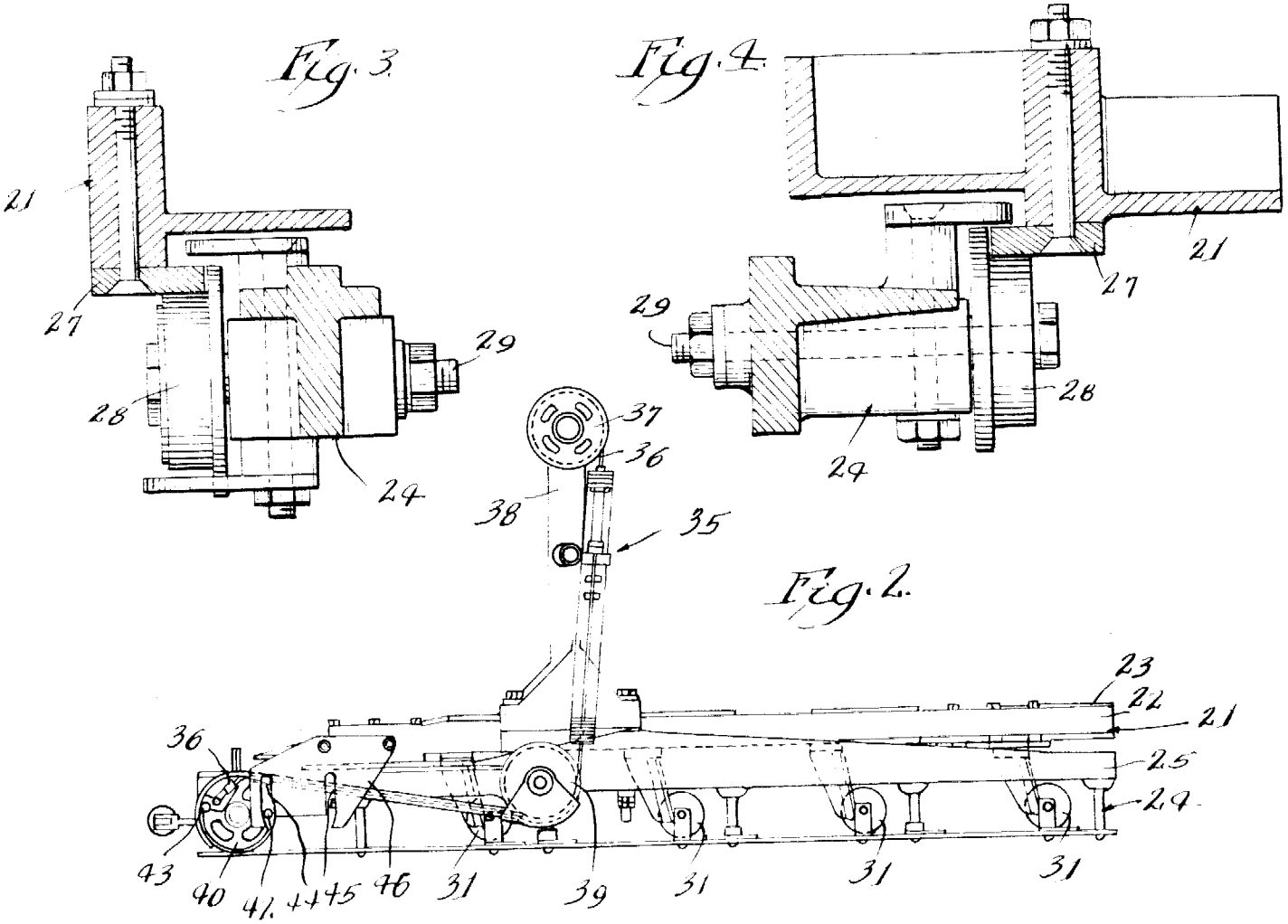

PIN DETECTING AND INDICATING APPARATUS

Original Filed Aug. 23, 1961 5 Sheets-Sheet 3

PIN DETECTING AND INDICATING APPARATUS

Original Filed Aug. 23, 1961 5 Sheets-Sheet 4

PIN DETECTING AND INDICATING APPARATUS
Original Filed Aug. 23, 1961 5 Sheets-Sheet 3
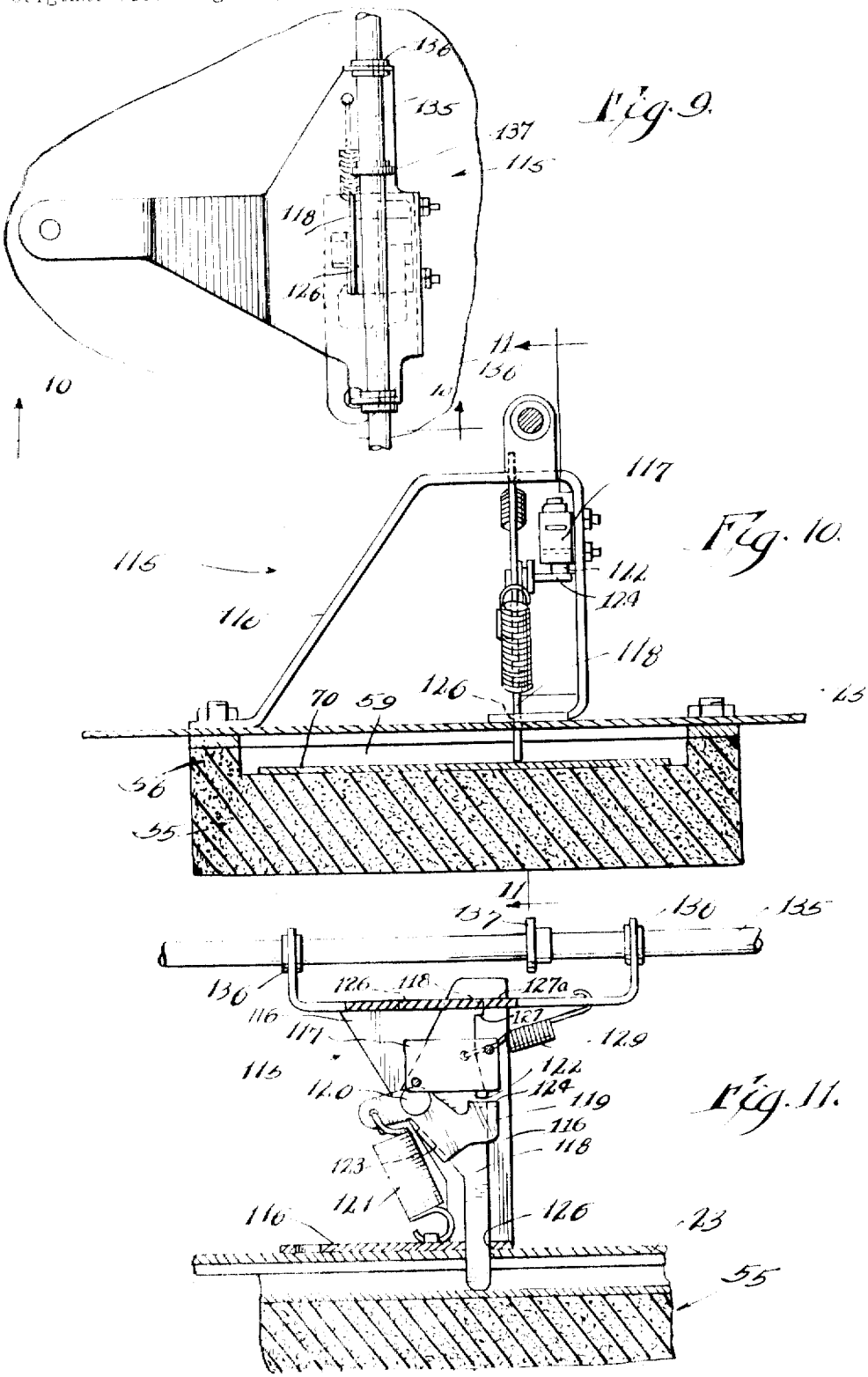

United States Patent Office

Re. 26,154
Reissued Jan. 31, 1967

26,154

PIN DETECTING AND INDICATING APPARATUS

Robert Torresen and Anthony J. Gretzky, Muskegon, Mich., assignors to Brunswick Corporation, Chicago, *Ill.*, a corporation of Delaware Original No. 3,094,325, dated June 18, 1963, Ser. No. 133,476, Aug. 23, 1961. Application for reissue May 13, 1965, Ser. No. 458,515
25 Claims. (Cl. 273—42)

Matter enclosed in heavy brackets [ ] appears in the original patent but forms no part of this reissue specification; matter printed in italics indicates the additions made by reissue.

This invention relates to apparatus for detecting standing pins on a bowling alley, and more particularly to such apparatus installed on automatic pinsetters to operate indicators.

It is the primary object of this invention to provide a new and improved pin detecting apparatus for bowling alley installations.

When standing at the foul line of a bowling alley it is often difficult to see which pins are still standing after rolling a ball. For example, it is often difficult to see a pin standing directly behind another pin, or to determine the precise position of a pin longitudinally of the alley. Various indicating systems have been developed for indicating to a player standing at the foul line precisely which pins are still standing on the alley. Such indicating systems usually are of an electrical nature and they have detecting portions mounted on an automatic pinsetter overlying the bowling alley. The pin detecting apparatus is often of an involved mechanical nature such that it is both expensive and complicated to install and maintain on the pinsetter. The electrical components between the detecting portions and indicators, which are usually electrical lights, also have previously been of a rather involved and expensive type.

Another object of this invention is to provide new and improved pin detecting apparatus for indicating bowling pins standing on a bowling alley during play of a game.

An important object of this invention is to provide a new and improved pin detecting apparatus installed on a bowling alley and having electrical switch assemblies operable by movement of part of the apparatus longitudinally of the bowling alley.

A more specific object of the invention is to provide a new and improved bowling pin detecting apparatus including a pinsetter deck assembly mounted for movement toward and away from a bowling alley and having an upper deck mounted on a lower deck for movement longitudinally of the alley with means on the upper deck for engaging the head of a pin standing on the alley when the deck assembly is lowered, a switch mounted on the upper deck and responsive to the first means engaging a standing pin for operating an indicator, and an actuator assembly for operating the switch to turn off the indicator responsive to the upper deck moving longitudinally of the alley and across the lower deck. A related object is the provision of such an actuator assembly comprising a flexible cable operatively associated with the lower deck plate and attached to the upper deck plate for operating the switch. Another related object is the provision of such an actuator assembly including a rigid rod operatively associated with the lower deck plate and attached to the upper deck plate for operating the switch.

Other objects and advantages will become readily apparent from the following detailed description taken in conjunction with the accompanying drawings, in which:

FIG. 2 is a side elevational view of the pinsetter deck structure of FIGURE 1, with parts removed to more clearly illustrate the construction;

FIG. 3 is an enlarged, fragmentary vertical section taken generally along the line 3—3 of FIG. 1;

FIG. 4 is an enlarged, fragmentary vertical section taken generally along the line 4—4 of FIG. 1;

FIG. 9 is an enlarged, fragmentary plan view of a switch assembly of FIG. 8;

FIG. 10 is a fragmentary vertical section taken generally along the line 10—10 of FIG. 9; and, FIG. 11 is a fragmentary vertical section taken generally along the line 11—11 of FIG. 10.

Figure 1:
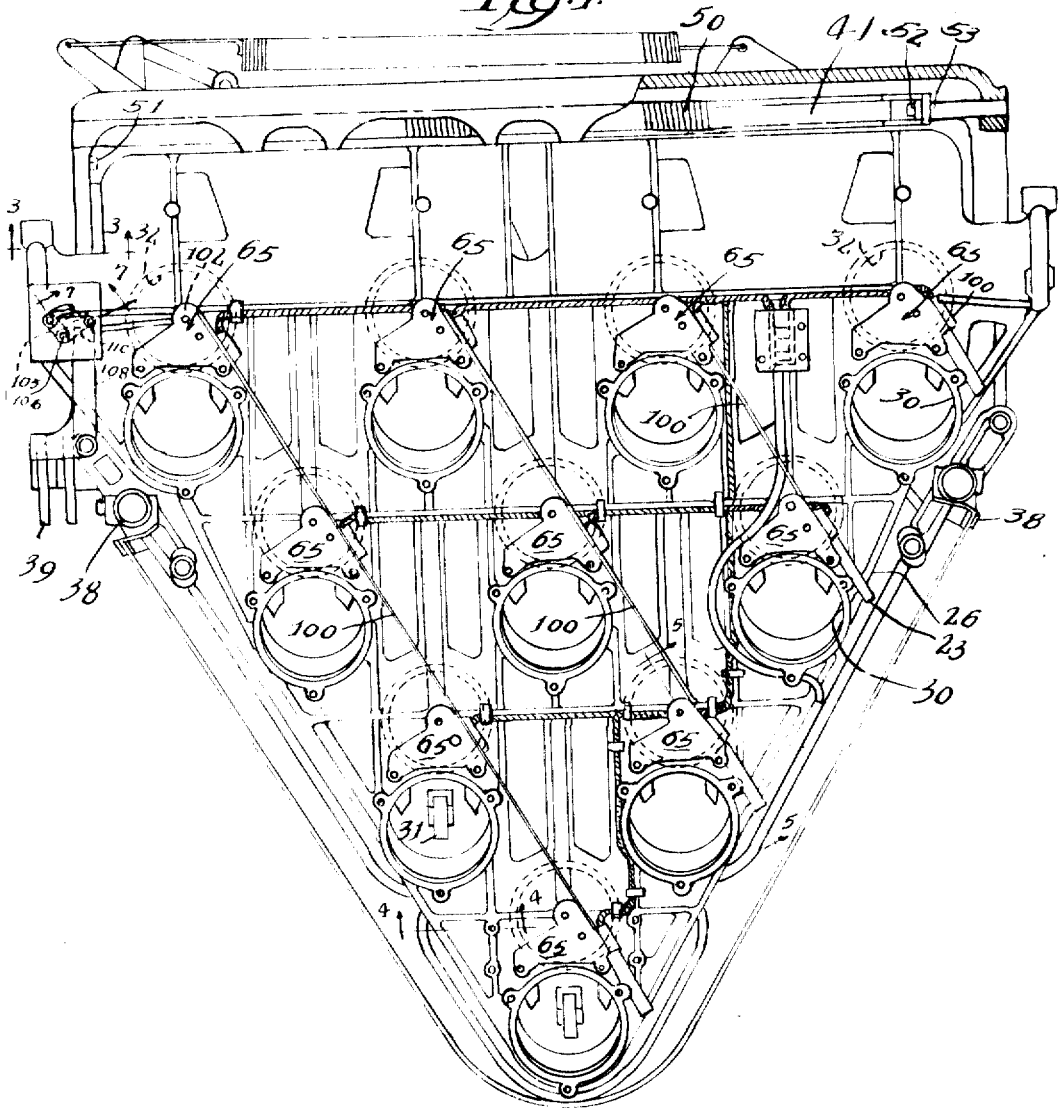
FIG. 1 is a plan view of a pinsetter deck structure including pin detecting apparatus embodying principles of the invention, with parts broken away and removed to more clearly illustrate the construction.

While illustrative embodiments of the invention are shown in the drawings it will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

The invention is, in brief, directed to a pin detecting apparatus movable longitudinally of a bowling alley and having switch assemblies, one for each of ten bowling pins. The switch assembly is operated for actuating an indicator in response to actuation of means for detecting a standing pin on the bowling alley. In the illustrated embodiments the pin detecting apparatus is mounted on an upper deck of a deck assembly in an automatic pinsetter. The deck assembly is mounted for movement toward and away from the bowling alley, and includes a lower deck which mounts the upper deck for movement longitudinally of the alley. In the illustrated embodiments, as the deck assembly moves toward the bowling alley, upon detection of a pin standing on the alley a related switch assembly is operated from a normal position to a set position for actuating an indicator corresponding to the detected pin. Actuator means, in one embodiment including a cable, and in another embodiment including a rigid rod, is provided for operating the switch assembly from set to normal position in response to movement of the upper deck longitudinally of the bowling alley. Movement and construction of the pinsetter may be of a substantially conventional nature and the pin detecting apparatus is constructed to cooperate with normal operation of the pinsetter. However, the pin detecting apparatus is not limited to operation in conjunction with any particular pinsetter and may be incorporated in structures other than pinsetters, as will be obvious to one skilled in the art.

Referring to FIGS. 1–4 of the drawings, the invention is illustrated in connection with an automatic pinsetter deck structure of the general type disclosed in U.S. Patent No. 2,949,300 to Huck et al., and reference may be had thereto for additional discussion of the pinsetter construction and operation. This deck structure is substantially horizontally disposed over the end of a bowling alley adjacent its pit for receiving pins from a suitable distributing mechanism, setting the pins on the bowling alley in preparation for bowling and, after a ball has been rolled, picking up the pins which remain standing to permit removal of dead wood and then resetting the last mentioned standing pins for continued bowling. After each frame the pinsetter resets pins on the bowling alley for play of the following frame.

Generally, the deck structure is vertically movable toward and away from the surface of the bowling alley (not shown) over which it is installed in a suitable manner. The pinsetter deck structure includes an upper deck 21 having a suitable generally triangular frame 22 with a generally triangularly shaped upper deck plate 23 preferably cast integrally with the frame, and a lower deck 24 having a suitable generally triangularly shaped lower deck frame or plate 25 or skeleton form. As illustrated in FIGURES 3 and 4, upper deck 21 is supported on lower deck 24 for movement longitudinally of the bowling alley by tracks 27 on the upper deck riding on rollers 28 journaled on shafts 29 mounted on the lower deck. Upper deck plate 23 has suitable openings 30 for receiving bowling pins from a suitable distributing mechanism (not shown) above the pinsetter. Pins delivered to openings 30 are received on suitable rollers 31 mounted on lower deck 24 when upper deck 21 is moved longitudinally of the alley and forwardly on lower deck 24 to a pin detecting position. By moving upper deck 21 longitudinally of the alley and rearwardly on lower deck 24 to a pin setting position (not shown), the upper deck plate openings 30 are generally aligned with and overlie pin passing openings (not visible) in the lower deck plate 25, and pins in upper deck openings 30 move off of lower deck rollers 31 and drop through the lower deck openings.

Mechanism for moving upper deck 21 across lower deck 24 is fully described in the aforementioned Huck patent, and will be briefly described herein in the form of a cable mechanism 35. Movement of the upper deck 21 forwardly on lower deck 24, from the pin setting position (not shown) to the pin detecting position illustrated in FIGURES 1 and 2 is accomplished by drawing a cable 36 over a pulley 37 journaled on the upper end of a support 38 which is mounted on lower deck 24. Cable 36 also passes around a pulley 39 journaled on lower deck 24, and passes around and is attached to a pulley 40 secured to the end of a shaft 41 for rotating pulley 40. Shaft 41 extends across the rear of lower deck 24 and is journaled at opposite ends on the lower deck. Secured to pulley wheel 40 are a pair of generally diametrically opposed outwardly extending cam pins 42 and 43 which are movable in cam slots 44 and 45, respectively, in a cam plate 46 secured to and depending from one side of upper deck 21, for moving the upper deck forwardly and rearwardly on lower deck 24. During movement of the upper deck to the pin detecting position shown in FIGURES 1 and 2, pulley wheel 40 is rotated clockwise as seen in FIGURE 2, winding a spiral torsion spring 50 which is telescoped on shaft 41 and has one end 51 anchored on lower deck 24 and an opposite end 52 attached to a spring anchor 53 secured on shaft 41. When cable 36 is released spring 50 partially unwinds, rotating pulley wheel 40 counterclockwise and cam pin 42 upwardly in slot 44, rapidly moving the upper deck 21 rearwardly on lower deck 24, whereupon cam pin 43 is engaged in cam slot 45 continuing rapid rearward movement of the upper deck. During rearward movement upper deck 21 is accelerated at about one gravity. Actuation of cable 36 is controlled in a suitable manner responsive to a pinsetter operating mechanism as is fully discussed in the previously mentioned Huck patent.

Mechanism is provided for lifting and resetting standing pins on the alley for removal of dead wood after the first ball of each frame. In the illustrated embodiment upper deck 21 is provided on its underside with circular resilient pads or disks 55 (FIGURE 6) suitably secured to the underside of upper deck plate 23 and positioned to engage pins standing on the alley when the deck assembly is lowered and in pin detecting position, whether the pins are standing exactly on spot or within a predetermined area surrounding the spot. Each pad 55 is preferably of a resilient material such as sponge rubber and has an upwardly extending ring 56 secured to a metal ring 57 which is mounted on upper deck plate 23 by upwardly extending bolts 58. Ring 56 may be secured to metal ring 57 in any suitable manner such as by an adhesive. Rings 56 and 57 define an upwardly opening recess 59 of resilient pad 55.

Engagement of pads 55 with the tops of standing pins holds the pins securely in position to be gripped at the neck thereof by scissor pick-up mechanism (not shown), one associated with each opening 32 and mounted on lower deck 24 for securely gripping a pin standing within opening 32 in lower deck 24. Suitable scissor pick-up mechanism is more fully discussed in both the aforementioned Huck patent and in Sanford Patent No. 2,817,528.

Means for detecting and indicating pins standing on the alley is provided by apparatus including switch assemblies 65 mounted on upper deck plate 23, and one associated with each opening 30 therein. Each switch assembly 65 is operated in response to a switch actuator detecting the presence of a standing pin on the bowling alley surface to operate a suitable indicator visible to the players, such as a light illuminated in response to operation of the respective switch assembly 65, as is more fully described in copending patent application of Conklin and Torresen for a "Pin Detecting and Indicating Apparatus," Serial No. 126,974, filed July 26, 1961, *and now Patent No. 3,118,671,* assigned to the assignee of this application.

Figure 5:
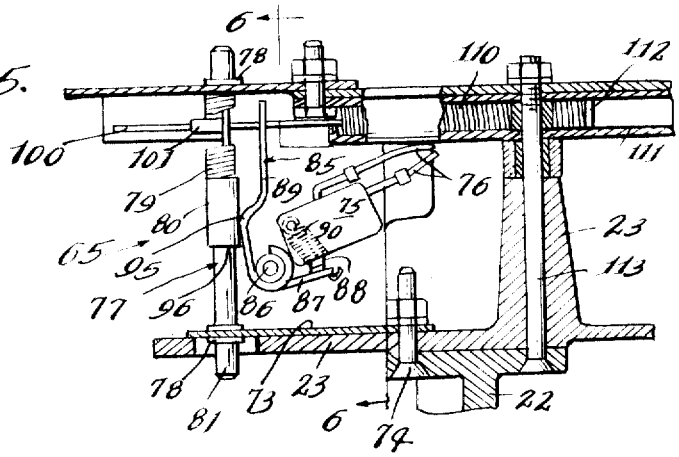
FIG. 5 is an enlarged, fragmentary vertical section of a switch assembly of the pin detecting apparatus taken generally along the line 5—5 of FIG. 1, with parts removed for clearer illustration.
Figure 6:
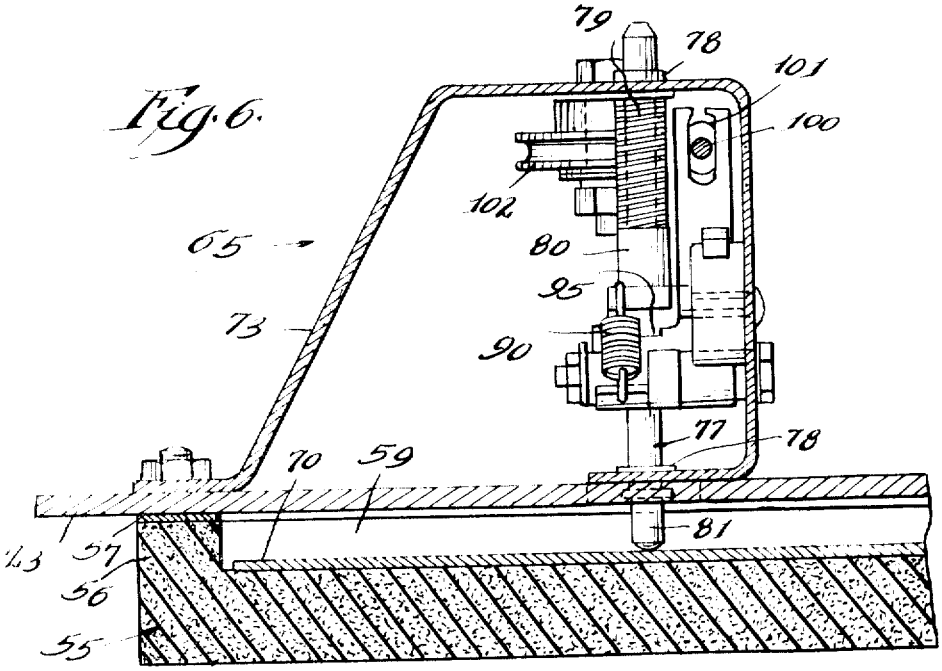
FIG. 6 is a fragmentary vertical section of the switch assembly taken generally along the line 6—6 of FIG. 5.
Figure 7:
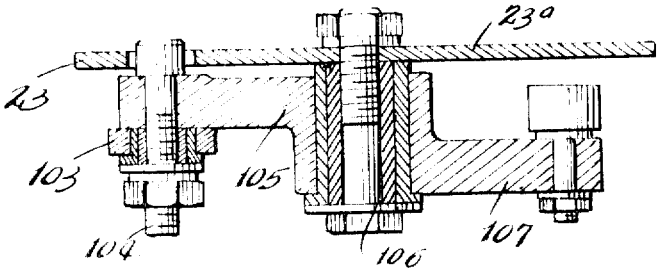
FIG. 7 is an enlarged, fragmentary vertical section taken generally along the line 7—7 of FIG. 1.

Referring to FIGURES 5 and 6, in the illustrated embodiment the switch actuators are in the form of the resilient pad assemblies 55 each receiving a rigid plate 70 in recess 59. When the resilient pad assembly engages the head of a standing pin it moves plate 70 upwardly to operate the related switch assembly 65 from a normal position in which the indicator light is out to a set position in which the indicator light is illuminated.

Each switch assembly 65 includes a base or frame 73 secured on the top of upper deck plate 23 in any suitable manner as by bolts 74. A switch 75, in the illustrated embodiment a microswitch, is mounted on base 73 for operation between normal and set positions. In the present embodiment the switch is open in normal position. Electric wires 76 connect the switch with the indicator light for turning on the light in the present embodiment when the switch is closed in set position.

Operating means responsive to the resilient pad assembly 55 engaging a pin standing on the alley is provided for operating switch 75 from normal to set position. In the present embodiment these means include a member in the form of a plunger 77 telescopically mounted in aligned bushings 78 in top and bottom portions of base 73 for movement between normal and set positions corresponding to similar positions of switch 75. Resilient means in the form of a spiral compression spring 79 are telescopically received on a shank positon of plunger 77 between a longitudinally extending enlarged cylindrical cam portion 80 of the plunger and upper bushing 78 for normally maintaining the plunger in its normal position with a lower end 81 urged outwardly and downwardly from upper deck plate 23.

These operating means also include a lever 85 mounted on base 73 by pin 86 for pivotal movement about a horizontal axis. Lever 85 is generally L-shaped and has a switch arm 87 for engaging a switch actuator 88, which is normally urged outwardly of the switch, to operate switch 75 from normal to set position. Lever 85 has an operating arm 89 extending upwardly from arm 87. Resilient means, in the form of a spiral tension spring 90 having an end attached to the outer end of arm 87 and an opposite end attached to base 73, resiliently urge lever 85 toward engagement with switch actuator 88. Cooperating portions are provided on plunger 77 and lever 85 for releasably holding arm 87 outwardly and releasing this arm for movement into engagement with switch actuator 88 to operate the switch from normal to set position in response to plunger 77 moving from its normal to set position. When resilient pad assembly 55 engages a pin standing on the bowling alley, rigid plate 70 moves upwardly against plunger end 81, moving the plunger upwardly to its set position. Cooperating portions on plunger 77 and lever 85 include the enlarged cam cylindrical portion 80 of plunger 77 which slides across and off a notched cam *follower* portion 95 of lever arm 89 to release the lever which is pivoted by spring 90 against a reduced shank portion of the plunger.

The operating means have latch means for releasably retaining plunger 77 in its set position. These latch means include the cooperating portions of plunger 77 and lever 85, and more particularly a lateral shoulder 96 on the bottom portion of plunger cam cylinder 80 which is engaged by the lever cam *follower* portion 95 with the notch *or offset in the portion 95* receiving the plunger shank.

Thus, when resilient pad assembly 55 engages the head of a pin standing on the bowling alley it is urged upwardly and rigid plate 70 urges plunger 77 upwardly until lever cam *follower* portion 95 moves from cylindrical cam portion 80 onto the plunger shaft portion responsive to spring 90 pivoting lever 85 about pin 86. When the upper part of lever cam *follower* portion 95 is engaged under plunger shoulder 96 the plunger is retained in its set position against the urging of spring 79.

An actuator assembly operates switches 75 from their set to normal position and in the present embodiment includes flexible cables having abutment collars 101 one associated with each switch assembly for engaging the upper end of the related lever operating arm 89 when the lever is set, to move the operating arm cam *follower* portion 95 out of engagement with plunger shoulder 96 and release switch actuator 88. After lever cam *follower* portion 95 has been disengaged from plunger shoulder 96 the plunger telescopes downwardly and lever cam *follower* portion 95 is held against counterclockwise movement by plunger cam cylinder 80.

With reference to FIGURE 1, four cables 100 extend diagonally across the top of upper deck 24 and each cable operates one or more switch assemblies 65. Cables 100 are guided by pulleys 102 each journaled on a base 73 for rotation about a vertical axis. Each cable has an end suitably secured to a fitting 103 pivotally attached as by a bolt 104 to one arm of a bell crank 105. The bell crank is suitably journaled by a nut and bolt assembly 106 on a housing 23a on upper deck plate 23 for pivotal movement about a vertical axis.

As the deck assembly moves from pin detecting position, shown in FIGURES 1 and 2, to pin setting position (not shown), that is as upper deck 21 moves longitudinally of the bowling alley and rearwardly across lower deck 24, a second arm 107 of the bell crank [engaging] *engages* an abutment 108 on the lower deck assembly 24 [moves], *and bell crank 105 is moved* clockwise, as viewed in FIGURE 1. Such clockwise movement of the bell crank permits limited movement of the cables 100 with respect to upper deck 21 due to resilient urging of spiral compression springs 110, one on the end of each cable 100 opposite fitting 103. These springs retain the respective cables taut. Each spring 110 is telescopically received in a socket member 111 and is compressed between the base of this socket member and an abutment 112 on the adjacent end of the respective cable 100. Socket member 111 is suitably secured to the upper deck plate 23 as by a nut and bolt 113. *Lever arm 89 is provided with a slot through which cable 100 passes, and a collar 101 is fixed on cable 100 for engaging lever arm 89 when the deck assembly moves from pin detecting to pin setting position to reset lever 85 from set to normal position.* When the deck assembly again moves from pin setting to detecting position springs 110 maintain their respective cable 100 tight and bell crank 105 is rotated counterclockwise through engagement with abutment 108 to prevent any slack developing in the cables 100.

Another embodiment of the pin detecting apparatus is illustrated in FIGURES 8–11 as applied to the previously described pinsetter. Upper deck plate 23 has surmounted thereon switch assemblies 115.

Referring to FIGURES 8–11, each switch assembly 115 includes a base or frame 116 mounted on the top of the upper deck plate 23. A switch 117, such as the microswitch of the foregoing embodiment, is mounted on base 116 and is operable between normal and set positions, for controlling a suitable indicator, as previously described.

Operating means responsive to resilient pad assembly 55 engaging a pin standing on the bowling alley is provided for operating switch 117 from normal to set position. In this embodiment these means includes a plunger member 118 slidably vertically and horizontally on base 116 between normal and set position for operating the switch from its normal to set position, respectively, and for retaining the switch in set position. A lever 119 is mounted on plunger 118 by pin 120 for pivotal movement about a horizontal axis. Plunger 118 is resiliently held in normal position and lever 119 is yieldably positioned by a spiral tension spring 121 for engaging switch actuator 122 as plunger 118 moves upwardly to set position. More particularly, spring 121 has opposite ends connected to an arm of lever 119 and an opposite end connected to base 116. This spring yieldably holds a lever abutment 123 against plunger 118 so that an abutment 124 on the lever is positioned for yieldably engaging switch actuator 122 for operating the switch to set position.

The operating means have latch means, in the form of cooperating portions of plunger 118 and base 116, for releasably retaining the plunger in its set position. Plunger 118 has opposite portions extending through slots 126 in upper and lower portions of base 116. These cooperating portions include a horizontally extending abutment defining a shoulder 127 on the upper end of plunger 118 which releasably engages a seat portion 127a on the base adjacent the right-hand end of slot 126 in the top of the base member, as viewed in FIGURE 11. Plunger 118 is retained in latched position by resilient means in the form of a spiral tension spring 129 having opposite ends secured to base 116 and to plunger 118. In normal position upper end of plunger 118 adjacent shoulder 127a is held against the base adjacent the slot by spring 121.

In this embodiment the actuator assembly for effecting operation of the switch 117 from set to normal position is in the form of rigid rods 135 telescoped in bushings 136 mounted in upstanding ears of the top portion of base 116. Abutment collars 137 are secured to these rods at each switch assembly 115, each for engaging the upper of respective plunger 118 when the plunger is in set position for moving the plunger to the left as viewed in FIGURE 11, thereby releasing the plunger from latched engagement with base 116, in response to upper deck 21 moving longitudinally of the alley and across lower deck 24 from pin detecting to pin setting position.

Figure 8:
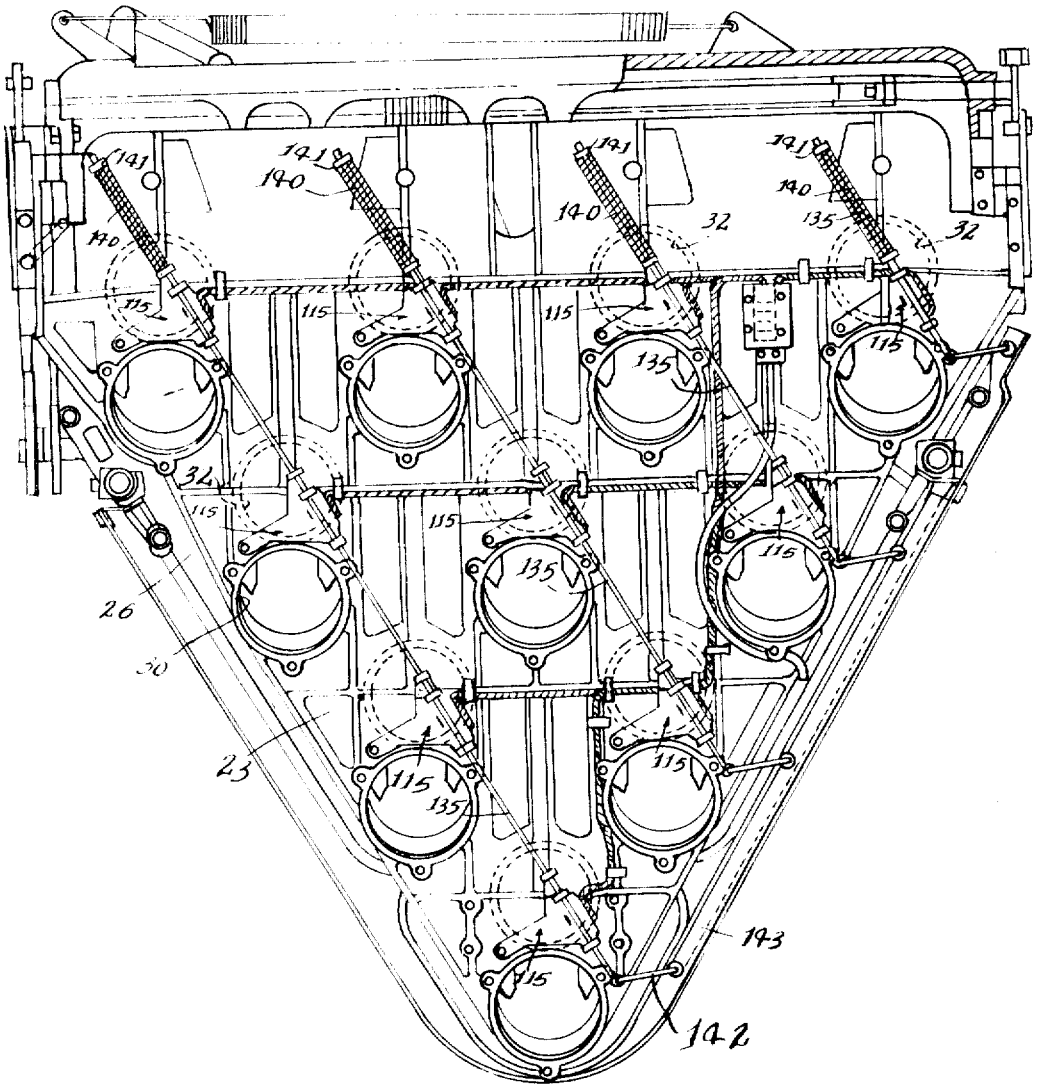
FIG. 8 is a plan view of a pinsetter deck structure similar to FIG. 1, but illustrating another embodiment of a pin detecting apparatus.

With reference to FIGURE 8, rods 135 extend diagonally across the top of the pinsetter deck assembly and each rod cooperates with one or more switch assemblies 115. Resilient means, in the form of spiral compression springs 140 are telescoped on one end of each rod 135 and are compressed between an adjacent bushing 136 on a base 116 and an abutment 141 on the outer end of the respective rod for limited movement of each rod with respect to upper deck plate 23, and for moving each rod with respect to the lower deck 24. The end of each rod opposite spring 140 is pivotally connected with horizontally movable ends of cranks 142 each vertically journaled in a member 143 secured to lower deck assembly 24. As upper deck 21 moves longitudinally of the alley and rearwardly across lower deck 24 from pin detecting to pin setting position, to the right in FIGURE 11, springs 140 are compressed and cranks 142 are rotated slightly clockwise thereby limiting movement of rod collars 137 with respect to the switch assemblies 115 and more particularly with respect to the upper end of plunger 118.

To summarize the operation of this embodiment, as the deck assembly moves downwardly toward the bowling alley with the decks 21 and 24 in pin detecting position, when a resilient pad assembly 55 engages the head of a standing pin on the bowling alley its rigid plate 70 is moved upwardly and moves plunger 118 upwardly from its normal to set position against the urging of tension spring 121. Lever 119 is yieldably urged into engagement with switch actuator 122 so as not to damage switch 117 if plunger 118 moves upwardly excessively. Tension spring 129 resiliently urges plunger 118 to the right as viewed in FIGURE 11, thereby positioning plunger abutment 127 for latching engagement with base 116 when resilient pad assembly 55 is disengaged from the standing pin. When upper deck 21 moves from pin detecting to pin setting position, that is rearwardly across lower deck 24, each rod collar 137 engages the top of related plunger 118 when in set position to unlatch the plunger and permit it to return to its normal position whereupon lever 119 moves downwardly and away from switch actuator 122 thereby operating the switch from set to normal position.

Thus, a pin detecting apparatus which is easily maintained and effective and reliable in operation while being relatively inexpensive and simple in construction is provided. The switches remain in set position until the upper deck moves to pin setting position, and holding circuits are eliminated from electrical control circuit to the indicators, further simplifying the system.

We claim:

1. In a bowling pin detecting and indicating apparatus for operating an indicator upon detection of a pin standing on a bowling alley, and installed on a deck assembly having a lower deck and an upper deck mounted for movement across the lower deck longitudinally of the bowling alley, the combination comprising: means on said upper deck for detecting a pin standing on the alley; a switch assembly having a base mounted on said upper deck, a switch mounted on said base and operable between normal and set positions for controlling the indicator, operating means including a member mounted on said base for movement between normal and set positions corresponding to similar switch positions, and upon movement of the member to its set position for operating said switch from normal to set position for rendering said indicator operative and releasably retaining said switch in set position, means normally maintaining said member in its normal position, and latch means for releasably retaining said member in its set position; means for moving said member to its set position responsive to the first said means detecting a standing pin; an actuator movable on the upper deck relative to the switch assembly and engageable therewith to move said member from set to normal position, and means on said lower deck operatively associated with said actuator to cause movement of the latter as the upper deck moves relative to the lower deck, thereby to operate the switch to normal position.

2. In the apparatus of claim 1, said actuator comprising a flexible cable.

3. In the apparatus of claim 1, said actuator comprising a rigid rod.

4. In a bowling pin detecting and indicating apparatus for operating an indicator upon detection of a pin standing on a bowling alley, and installed on a deck assembly mounted for movement toward and away from the bowling alley and having a lower deck and an upper deck mounted for movement across the lower deck longitudinally of the alley, the combination comprising: a resilient pad on said upper deck for engaging the head of a pin standing on the alley when the deck assembly is lowered; a switch assembly having a base mounted on said upper deck, a switch mounted on said base and operable between normal and set positions for controlling the indicator, operating means including a member mounted on said base for movement between normal and set positions corresponding to similar switch positions and upon movement of said member to set position for operating said switch from normal to set position for rendering said indicator operative and releasably retaining said switch in set position; means normally maintaining said member in its normal position, and latch means for releasably retaining said member in its set position; means for moving said member to its set position responsive to said resilient pad engaging a standing pin; an actuator assembly operatively associated with the lower deck plate and said switch assembly for relative movement of the switch assembly with respect to the actuator assembly as the upper deck moves longitudinally of the alley across the lower deck; and cooperating means on said actuator assembly and member for moving said member from set to normal position responsive to movement of the upper deck longitudinally of the alley in one direction with respect to the lower deck, thereby operating said switch from set to normal position to render said indicator inoperative.

5. In the apparatus of claim 4, said member comprising a plunger telescopically mounted on said base, said operating means comprising a lever pivotally mounted on said base, and said plunger and lever having cooperating portions for operating said switch, and said latch means comprising said cooperating portions.

6. In the apparatus of claim 4, said member comprising a plunger slidable on said base, said operating means comprising a lever pivoted on said plunger and yieldably positioning said switch in its set position responsive to movement of said plunger to its set position, and said latch means comprising cooperating portions of said plunger and base.

7. In the apparatus of claim 4, said actuator assembly comprising a flexible cable operatively associated with said lower deck for limited movement with respect to the lower deck, resilient means attaching the cable to the upper deck for limited movement of the cable with respect to the upper deck and for maintaining said cable taut, and said cooperating means comprising cooperating abutments on said member and cable.

8. In the apparatus of claim 4, said actuator assembly comprising a rigid rod operatively associated with the lower deck for limited movement with respect to the lower deck, resilient means mounting the rod on the upper deck for limited movement of the rod with respect to the upper deck and for moving the rod with respect to the lower deck, and said cooperating means comprising cooperating abutments on said member and rod.

9. In a bowling pin detecting apparatus, a deck structure movable toward and away from a bowling alley including a lower deck and an upper deck movable relative to the lower deck, switch means on the upper deck operable to indicate the presence of a standing pin on the alley, switch operating means on the upper deck engageable with the head of a standing pin on the alley and operable thereby on movement of the deck structure toward the alley for operating said switch means, means on the upper deck for resetting the operating means, and means on said lower deck engaging and operating said resetting means on movement of the upper deck relative to the lower deck.

10. In a pinsetter, a pinsetting deck structure movable toward and away from a bowling alley including a lower deck and an upper deck mounted for movement relative to the lower deck longitudinally of the bowling alley, pin detecting means on the upper deck at positions corresponding to pin positions on the alley engageable with the heads of standing pins on the alley on movement of the deck structure toward the alley, switches on the upper deck corresponding respectively to the pin detecting means, switch operating means on the upper deck respectively operable by said pin detecting means for respectively operating said switches, means on the upper deck for retaining said operating means in operated condition, resetting means on the upper deck for resetting said retaining means, and means on the lower deck engaging and operating said resetting means on movement of the upper deck relative to the lower deck.

11. A combination as defined in claim 10, wherein said resetting means comprises cable means on the upper deck having abutment means thereon engageable with said retaining means to reset the latter on longitudinal movement of the cable means, resilient means at one end of the cable means biasing the cable means in a direction to reset the retaining means, and a crank pivotally mounted on the upper deck and having one arm connected to the opposite end of the cable means for moving the latter in a direction opposite to resetting movement; and said means on the lower deck comprising an abutment on the lower deck engaging the other arm of the crank and normally opposing movement of the crank by said resilient means and permitting movement of the crank on movement of the upper deck relative to the lower deck.

12. A combination as defined in claim 10, wherein said resetting means comprises elongate rod means on the upper deck having abutment means thereon engageable with said retaining means for resetting the latter on movement of the rod means in one direction, and resilient means normally biasing the rod means in a direction opposite to resetting movement; and said means on the lower deck comprises arm means mounted on the lower deck and connected to the rod means for moving the latter in a resetting direction relative to the retaining means on movement of the upper deck relative to the lower deck.

13. In a pinsetter including a deck assembly having a lower deck and an upper deck mounted for movement with respect to the lower deck longitudinally of the alley, the combination comprising: a switch assembly mounted on the upper deck and operable between two different positions; means for operating the switch assembly from one position to the other to signal the presence or absence of a standing pin; an actuator assembly on the upper deck movable relative to the switch assembly; cooperating means on the actuator assembly and switch assembly for operating the latter from said other position to said one position on movement of the actuator assembly relative to the switch assembly; and cooperating means on the lower deck and the actuator assembly for causing movement of the actuator assembly relative to the switch assembly on movement of the upper deck relative to the lower deck.

14. A combination as defined in claim 13, wherein said actuator assembly comprises a flexible cable mounted on the upper deck for limited movement with respect to said switch assembly and having abutment means engageable with said switch assembly to operate the latter on longitudinal movement of the cable, and resilient means biasing the cable in a direction to operate the switch assembly to said one position, said last mentioned cooperating means releasing said cable for operation by said resilient means.

15. A combination as defined in claim 13, wherein said actuator assembly comprises an elongated rod movable on the upper deck having abutment means thereon engageable with said switch assembly for operating the latter on movement of the rod in one direction, and resilient means normally biasing the rod in a direction opposite to the direction of movement required for operating the switch assembly.

*16. A bowling pin detecting and indicating apparatus for operating an indicator upon detection of a pin standing on a bowling alley, and installed on a deck assembly mounted for movement toward and away from the bowling alley, comprising: in combination a resilient pad on said deck assembly for engaging the head of the pin standing on the alley when the deck assembly is lowered; a bracket on said deck assembly; a switch carried by said bracket and operable between normal and set positions; means for actuating said switch from normal to set position including, a pivotally mounted actuating lever movable between normal and set positions corresponding to the normal and set positions of said switch, said actuating lever having a first portion for operating said switch from normal to set position, said actuating lever having a second portion, spring means biasing said actuating lever toward the set position, a plunger mounted on said bracket for reciprocating movement between normal and set positions and having first means thereon engageable with said actuating lever second portion to prevent movement of said actuating lever from normal to set position, and means on said plunger cooperating with said actuating lever second portion upon reciprocation of said plunger from normal to set position when said deck assembly moves toward said alley and said resilient pad engages the head of a standing pin to allow said lever to pivot from normal to set position whereby said switch is operated from normal to set position; means for releasably latching said plunger in set position; and means for releasing said latching means to operate said switch from set to normal position including, an actuator having means for freeing said plunger for movement to normal position, and means for imparting lengthwise movement to said actuator whereby said actuator means releases said plunger for movement to normal position so that said spring means returns said actuating lever and said switch to normal position.*

*17. A bowling pin detecting and indicating apparatus for operating an indicator upon detection of a pin standing on a bowling alley, and installed on a deck assembly mounted for movement toward and away from the bowling alley, comprising: in combination a resilient pad on said deck assembly for engaging the head of the pin standing on the alley when the deck assembly is lowered; a bracket on said deck assembly and having a base; a switch carried by said bracket and operable between normal and set positions; means for actuating said switch from normal to set position including, an actuating lever pivotally mounted on said bracket and movable between normal and set positions corresponding to the normal and set positions of said switch, said actuating lever having a first portion for operating said switch from normal to set position, said actuating lever having a second portion with cam follower means thereon, spring means biasing said actuating lever toward the set position, a plunger mounted on said bracket for reciprocating movement and having first means thereon engageable with said actuating lever second portion to prevent movement of said actuating lever from normal to set position, the lower portion of said plunger extending below the base of said bracket in position for actuation by engagement of said resilient pad with a standing pin upon movement of said deck assembly toward said bowling alley, cam means on said plunger for engaging the cam follower means on said actuating lever second portion upon reciprocation of said plunger to allow said lever to pivot from normal to set position whereby said switch is operated from normal to set position; cooperating means on said plunger and said actuating lever second portion for releasably latching said lever and said switch in set position; and means for operating said switch from set to normal position including, an elongate flexible cable having means engageable with said actuating lever second portion, and means for imparting lengthwise movement to said cable whereby said cable means engages said actuating lever second portion and said lever is pivoted to free said cooperating means on said actuating lever second portion and said plunger from locking*

*engagement so that said spring means returns said actuating lever and said switch to normal position.*

*18. A bowling pin detecting and indicating apparatus for operating an indicator upon detection of a pin standing on a bowling alley, and installed on a deck assembly mounted for movement toward and away from the bowling alley, comprising: in combination a resilient pad on said deck assembly for engaging the head of the pin standing on the alley when the deck assembly is lowered; a bracket on said deck assembly; a switch carried by said bracket and operable between normal and set positions; means for actuating said switch from normal to set position including, a pivotally mounted actuating lever movable between normal and set positions corresponding to the normal and set positions of said switch, said actuating lever having a first portion for operating said switch from normal to set position, said actuating lever having a second portion with an abutment thereon, spring means biasing said actuating lever toward the set position, a plunger mounted on said bracket for reciprocating movement between normal and set positions and pivotally supporting said actuating lever, said plunger having first means thereon engageable with the abutment on said actuating lever second portion when said plunger is in normal position to prevent movement of said actuating lever from normal to set position, said plunger first means being movable upon reciprocation of said plunger from normal to set position when said deck assembly moves toward said alley and said resilient pad engages the head of a standing pin to allow said lever to pivot from normal to set position whereby said switch is operated from normal to set position; means for releasably latching said plunger in set position; and means for releasing said latching means including, a rigid rod having means engageable with said plunger, and means for imparting lengthwise movement to said rod whereby said rod means engages said plunger to free the same for movement whereby said spring means returns said actuating lever and said plunger to normal position.*

*19. A bowling pin detecting apparatus for operating an indicator upon detection of a pin standing on a bowling alley, comprising, in combination,*

*(a) a support structure mounted for movement over a bowling alley toward and away from the alley surface and the head of a bowling pin standing on the surface;*

*(b) a switch assembly including a switch operable between first and second conditions and means supporting the switch on the support structure;*

*(c) means for operating the switch from one condition to the other including*

*(c–1) an actuating member mounted on the support structure and adapted to be moved thereon from a normal position to a set position on movement of the support structure toward a standing pin,*

*(c–2) a switch operating member mounted for movement from a normal position to a set position in response to movement of the actuating member to set position to operate said switch from first condition to second condition,*

*(c–3) means responsive to movement of the switch operating member to set position for holding the same in set position on movement of the support structure away from a standing pin; and*

*(d) a reset member separate from and movable relative to the operating means and support structure for resetting the switch operating member to normal position.*

*20. A combination as defined in claim 19 including*

*(e) means normally biasing said actuating member toward normal position,*

*(f) means normally biasing said operating member toward set position,*

*(g) cooperating means on the actuating member and the operating member for holding the operating member in normal position when the actuating member is in normal position, and*

*(h) cooperating means on the actuating member and the operating member for holding the actuating member in set position when the operating member is in set position.*

*21. A combination as defined in claim 20 including*

*(i) cooperating means on the reset member and the operating member for moving the operating member to normal position, permitting return of the actuating member to normal position.*

*22. A combination as defined in claim 19 wherein*

*(c–1a) said actuating member comprises a reciprocable plunger,*

*(c–2a) said switch operating member comprises a crank-shaped lever pivotally mounted on said support structure, and*

*(d–1) said reset member comprises a reciprocable cable,*

*and including*

*(e) spring means acting between the support structure and the plunger urging the latter toward normal position,*

*(f) spring means acting between the support structure and the lever urging the latter toward set position,*

*(g) cooperating means on the plunger and the lever for holding the lever in normal position when the plunger is in normal position,*

*(h) cooperating means on the plunger and the lever for holding the plunger in set position when the lever is in set position, and*

*(i) a collar on the reciprocable cable for engaging the lever to move the latter to normal position, permitting return of the plunger to normal position.*

*23. A combination as defined in claim 19 including*

*(e) means normally biasing said actuating member toward normal position,*

*(f) means normally biasing said operating member toward set position,*

*(g) cooperating means on the actuating member and the operating member for holding the operating member in normal position when the actuating member is in normal position, and*

*(h) cooperating means on the actuating member and the support structure for holding the actuating member in set position when the operating member is in set position.*

*24. A combination as defined in claim 23 including cooperating means on the reset member and the actuating member for releasing the actuating member for return to normal position, permitting return of the operating member to normal position.*

*25. A combination as defined in claim 19 wherein*

*(c–1a) said actuating member comprises a reciprocable plunger,*

*(c–2a) said switch operating member comprises a lever pivotally mounted on said actuating member, and*

*(d–1) said reset member comprises a reciprocable rod,*

*and including*

*(e) spring means acting between the support structure and the lever urging the lever to set position and the plunger to normal position,*

*(f) spring means acting between the support structure and the plunger for holding the latter in set position,*

*(g) cooperating means on the plunger and the lever for holding the lever in normal position when the plunger is in normal position,*

*(h) cooperating means on the plunger and the support structure for holding the plunger in set position, and*

*(i) a collar on the reciprocable rod for engaging the plunger to release the latter for return to normal position, returning the lever to normal position.*

References Cited by the Examiner

The following references, cited by the examiner, are of record in the patented file of this patent or the original patent.

UNITED STATES PATENTS

| | | | |
|---|---|---|---|
| 2,817,528 | 12/1957 | Sanford | 273—42 |
| 2,890,886 | 6/1959 | Dumas | 273—43 |

| | | | |
|---|---|---|---|
| 2,977,121 | 3/1961 | Flint et al. | 273—42 |
| 3,094,326 | 6/1963 | Torresen et al. | 273—42 |
| 3,118,671 | 1/1964 | Conklin et al. | 273—42 |

ANTON O. OECHSLE, *Primary Examiner.*

DELBERT B. LOWE, JAMES W. LOVE, F. BARRY SHAY, C. B. PRICE, *Examiners.*